(No Model.)
W. H. MYERS.
BICYCLE WAY.
No. 549,385. Patented Nov. 5, 1895.
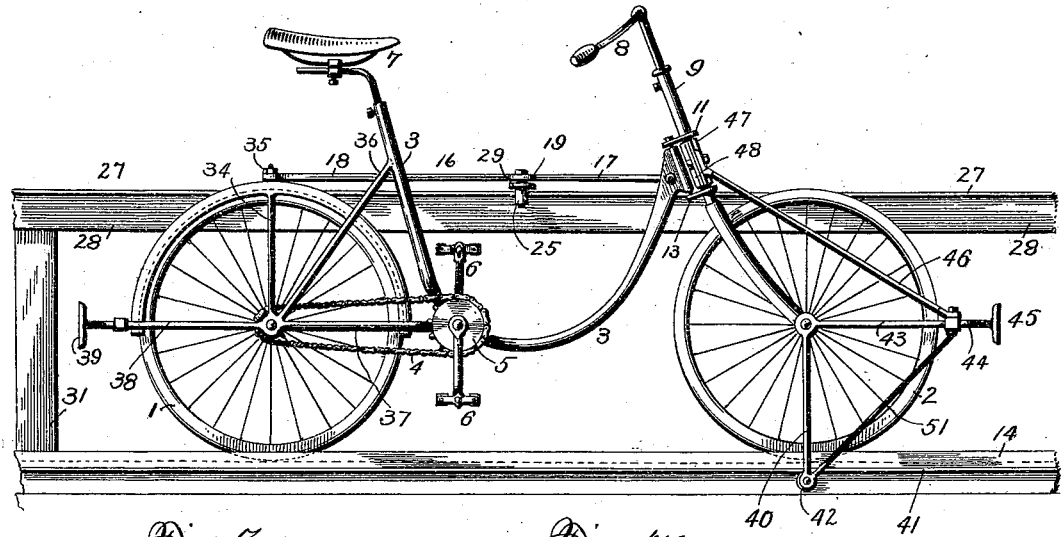
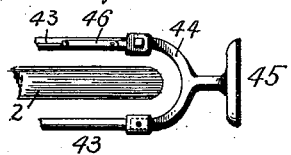
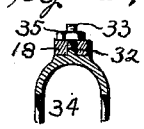
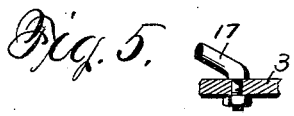
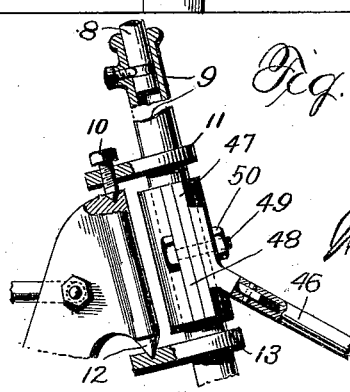
Witnesses
C. J. Williamson
Alfred T. Gage
Inventor
William Harold Myers
by R. S. Henderson
Attorney

UNITED STATES PATENT OFFICE.

WILLIAM HAROLD MYERS, OF BURLINGTON, NEW JERSEY, ASSIGNOR TO HENRY B. WEAVER, OF SAME PLACE.

BICYCLE-WAY.

SPECIFICATION forming part of Letters Patent No. 549,385, dated November 5, 1895.

Application filed October 29, 1894. Serial No. 527,265. (No model.)

*To all whom it may concern:*

Be it known that I, WILLIAM HAROLD MYERS, a citizen of the United States, residing at Burlington, in the county of Burlington and State of New Jersey, have invented certain new and useful Improvements in Pleasure-Railways; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to pleasure-railways, and has for its object to combine in such a structure the features of an ordinary bicycle with means for sustaining the bicycle in an upright position while traveling over a track and to so construct and combine the parts that the structure will be strong and not liable to get out of working order by any strain to which it may be subjected and so that a high rate of speed can be attained.

To the accomplishment of the foregoing and such other objects as may hereinafter appear the invention consists in the construction and also in the combination of parts hereinafter particularly described and then sought to be specifically defined by the claims, reference being had to the accompanying drawings, forming part hereof.

Figure 1 is a side elevation of a bicycle, track, and guide-roller embodying my invention. Fig. 2 is a rear end view of the same. Fig. 3 is a detail plan with parts broken away, showing one of the bumpers with part of the wheel and brace-rod. Fig. 4 is a detail view on a large scale, showing a portion of the steering-head and parts connected thereto. Fig. 5 is a detail view of a portion of one of the guide-arms and upper forward end of the bicycle-frame, the latter being in section. Fig. 6 is a detail sectional view of a portion of the yoke which straddles the driving-wheel, and Fig. 7 is a detail plan of a portion of the guide-frame.

In the drawings, the numeral 1 designates the rear or driving wheel of the bicycle; 2, the front or steering wheel; 3, the frame, which preferably is of the drop order illustrated; 4, the driving-chain; 5, the sprocket-wheel; 6, the foot-pedals; 7, the seat; 8, the handle-bars, and 9 the steering-head, all of which may be of any well-known and approved pattern.

The forward portion of the frame 3 is connected to the steering-head 9 by means of a screw-pivot 10, passed through a collar 11, keyed or otherwise secured to the steering-head, the point of the screw fitting into the top of the end of the frame, as illustrated. A point 12 at the under side of the end of the frame fits into a cavity formed in the collar 13, keyed or otherwise secured to the steering-head. By pivotally connecting the steering-head and the forward end of the frame in the manner described the free movement of the steering-head is permitted. I swivel the handle-bar 8 to the head 9 in any suitable manner—for instance, as illustrated in Fig. 4—so that the handle-bars can be used by the rider to steady himself in the seat without turning the steering-wheel, which will be guided by the track on which it runs, or otherwise.

The bicycle which runs upon the track 14, which preferably is formed with a V-shaped groove 15, is held in an upright position by means of a laterally-extending frame 16, which is preferably formed of the two arms or rods 17 and 18, attached at one end to a suitable part of the bicycle and suitably connected at their opposite ends to a guide-rail in a manner that will offer the least frictional contact with said guide-rail. I prefer to cast the arms 17 and 18 and their connecting-web 19 in one piece. In the web 19 I form an elongated slot 20, through which I pass the pintles 21 and 22, and secure the same in the slot by means of nuts 23 and 24, a collar or shoulder being formed on the pintles beneath the web, so that by turning the nuts 23 and 24 the pintles will be held firmly in their adjusted positions. These pintles carry, respectively, friction-rolls 25 and 26, which are designed to bear against the opposite edges of a plate 27, secured to the rail 28, so as to prevent the bicycle from swaying sidewise. The plate 27 projects over the outer faces of the rail 28, so as to form flanges, and the friction-rollers 25 and 26 are formed each with a flange 29 and 30, adapted to fit, respectively, one above and the other below the projecting edges of the plate 27, so as to prevent the rods or arms 17 and 18 from moving in a vertical plane, thereby holding the arms in a horizontal position and consequently holding the bicycle in an upright position. Two of the rails 28 are provided, one for each of the tracks 14, one of said tracks being the return track for the bicycle. The rails are supported by standards or posts 31. The inner end of the arm or rod 17 is threaded and passed through the forward upper end of the frame 3, as illustrated, and a nut is applied, so as to secure it rigidly to said frame. The inner end of the rod or arm 18 is formed with an eye 32, which fits over a pin 33, cast upon the top of the yoke 34 and threaded, so that the nut 35 may be screwed thereon to hold the arm or rod to said yoke. This yoke 34 straddles the driving-wheel 1 and is supported from the main frame in a suitable manner at a point next to or adjacent to the bearings for the wheel. It may be cast as a portion of the frame 3 and its braces 36 and 37. A second yoke 38 may straddle the drive-wheel 1 from the rear and have on its end a bumper 39, which yoke may also be cast in one piece with the yoke 34.

In order to prevent the bicycle from jumping the track, I provide two hangers 40, which extend downward from opposite sides of the front wheel 2 to a point below flanges 41, projecting from opposite sides of the track 14, and they carry at their lower ends rollers 42, which lie beneath said flanges 41 and prevent the front of the bicycle being raised and jumping the track. These hangers are provided at the front wheel, because in the event of one bicycle running into another one in front of it the concussion tends to lift the front of the bicycle which runs into the other bicycle and thus throw it from the track; but by providing these hangers and locating them as specified the bicycle will be held to the track. I also provide a bumper for the front of the bicycle. This bumper I prefer to form of two arms 43, which may be cast with the hangers 40, and which project forward of the wheel and have sockets formed at their ends, into which will fit the ends of the U-shaped casting 44, which is provided with a head 45, constituting the face of the bumper. The ends of the U-shaped casting 44 will be held in the sockets of the rods 43 by bolts or they may be allowed a sliding movement in the rods 43 and a spring be placed in the rods back of the ends of the casting, so as to form a cushion for the same, but no claim is made to thus cushioning the casting, and therefore no detailed illustration thereof is given.

In order to give increased strength to the forward portion of the bicycle and to render the same better adapted to resist the strain and be prevented from getting seriously damaged in the event of collision with other bicycles on the track, I extend two brace-rods 46 from the forward portion of the bumper to the front wheel backwardly and upwardly to a two-part boxing or collar 47, fitted around the steering-head of the bicycle, the two parts of the boxing 47 being formed with flanges 48, through which bolts 49 will pass, so as to secure the boxing or collar and the upper ends of the brace-rods to the steering-head, the bolts which pass through the flanges also passing through the upper ends of the brace-rods and provided with nuts 50 for holding the parts together. I prefer to form the opposite ends of the brace-rods in the form of separate castings, each having a shank entering the central portion of the brace-rods, which preferably will be tubular, the castings and tubular portions of the brace-rods being held together by suitable pins passed through the same. In order to brace the rods 43 and the hangers 40, I connect the two by means of brace-rods 51.

In operation the bicycle is mounted and propelled in the usual way of all bicycles; but it is held in its upright position by the laterally-extending arms or frame connecting it to the guide-rails and after running the length of the track the turn is made and the return made on the other track. By employing the two parallel guide-rails 28 the bicycles are enabled to run in opposite directions on the two tracks without the frictional guide-rollers of one interfering with those of the other.

The construction described makes a pleasure-railway of the kind illustrated which is comparatively simple in its construction and affording the maximum of strength and durability. It is also perfectly safe in operation and free from the dangers attending many other constructions. The device is also comparatively inexpensive to construct and build.

I have described with particularity and illustrated what I consider to be the best details of construction of the several parts employed; but changes may be made in the details without departing from the essential features of the invention.

Having described my invention and set forth its merits, what I claim is—

1. In a pleasure railway, the combination of a bicycle, mechanism for propelling the same, a track for the bicycle to run upon, a guide located above the plane of said track and to one side only of the bicycle, and a laterally extending frame or arm connecting the bicycle and said guide rail on one side only of the bicycle leaving the other side open and unobstructed in mounting and dismounting from the bicycle, substantially as and for the purposes described.

2. In a pleasure railway, the combination with a bicycle and mechanism for propelling the same, of a guide rail located above the plane of the bicycle track and to one side only of said bicycle, a frame or arm extending laterally from one side only of the bicycle, leaving the other side open and unobstructed in mounting and dismounting from the bicycle, and a roller forming a roller-contact between said guide rail and laterally extending arm, substantially as and for the purposes described.

3. In a pleasure railway, the combination with a bicycle and mechanism for propelling the same, of a guide rail, a frame or arm extending laterally from the bicycle and connecting it with said guide rail, and rollers connected with said laterally extended frame or arm and lying on opposite sides of said guide rail, substantially as and for the purposes described.

4. In a pleasure railway, the combination with a bicycle and means for propelling the same, of a guide rail having lateral flanges, a frame or arm extending laterally from the bicycle to a point adjacent to said guide rail, and flanged rollers connected with said frame or arm and lying on opposite sides of said guide rail with the flanges of the rollers lapping the flanges of the guide rail, substantially as and for the purposes described.

5. In a pleasure railway, the combination with a bicycle and means for propelling the same, of a guide rail, an arm or frame extending laterally from the bicycle and formed at its end next to the guide rail with an elongated slot, and pintles or bolts passed through said slot and carrying friction rollers lying on opposite sides of said guide rail substantially as and for the purposes described.

6. In a pleasure railway, the combination with the bicycle and means for propelling the same, of the guide rail, the frame extending laterally from the bicycle and connecting it with the guide rail, said frame consisting of the two arms connected together at their outer end by a web having an elongated slot, the inner end of one of said arms passing through the bicycle frame and secured thereto, the inner end of the other arm being formed with an eye, a yoke straddling the driving wheel and having a pin passing through the eye of one arm of the laterally extending frame, and rollers connected with said frame and lying on opposite sides of the guide rail, substantially as and for the purposes described.

7. In a pleasure railway, the combination with the bicycle and means for propelling the same, of the track for the bicycle to run upon, flanges projecting laterally from said track, and the hanger extending from a portion of the bicycle and carrying at its lower ends rollers lying beneath the lateral flanges of the track, substantially as and for the purposes described.

8. In a pleasure railway, the combination with a bicycle, of the rods or bars extending forward of the front wheel of the bicycle and having a head constituting a bumper, and the braces connected at their lower ends to the bumper and at their upper ends to the steering head, substantially as and for the purposes described.

9. In a pleasure railway, the combination with the bicycle, and means for propelling the same, of the rods or bars extending forward of the front wheel and having a head constituting a bumper, the braces connected at their lower ends to said bumper with their upper ends lying adjacent to the steering head, and a two part collar or sleeve encircling the steering head and formed with flanges to which the upper ends of the braces are connected by bolts, substantially as and for the purposes described.

10. In a pleasure railway, the combination with the bicycle and means for propelling the same, of rods or bars extending forward of the front wheel and having a head constituting a bumper, a hanger extending below the wheel, a rod connecting the bumper and said hanger, a track having lateral flanges, and friction rollers at the lower end of the hanger and lying beneath said flanges, substantially as and for the purposes described.

11. In a pleasure railway, the combination with a bicycle and mechanism for propelling the same, of a guide rail, a frame or arm extending laterally from the bicycle and connecting it with said guide rail, and a swivel intermediate of the handle-bars and wheel of the bicycle whereby one of said parts can turn without turning the other, substantially as and for the purposes described.

In testimony whereof I affix my signature in presence of two witnesses.

WILLIAM HAROLD MYERS.

Witnesses:
HENRY B. WEAVER,
THOMAS BAKER.